No. 609,070. Patented Aug. 16, 1898.
J. H. ZOOK.
DEVICE FOR RAISING OR LOWERING COFFINS.
(Application filed Feb. 14, 1898.)
(No Model.) 2 Sheets—Sheet 2.
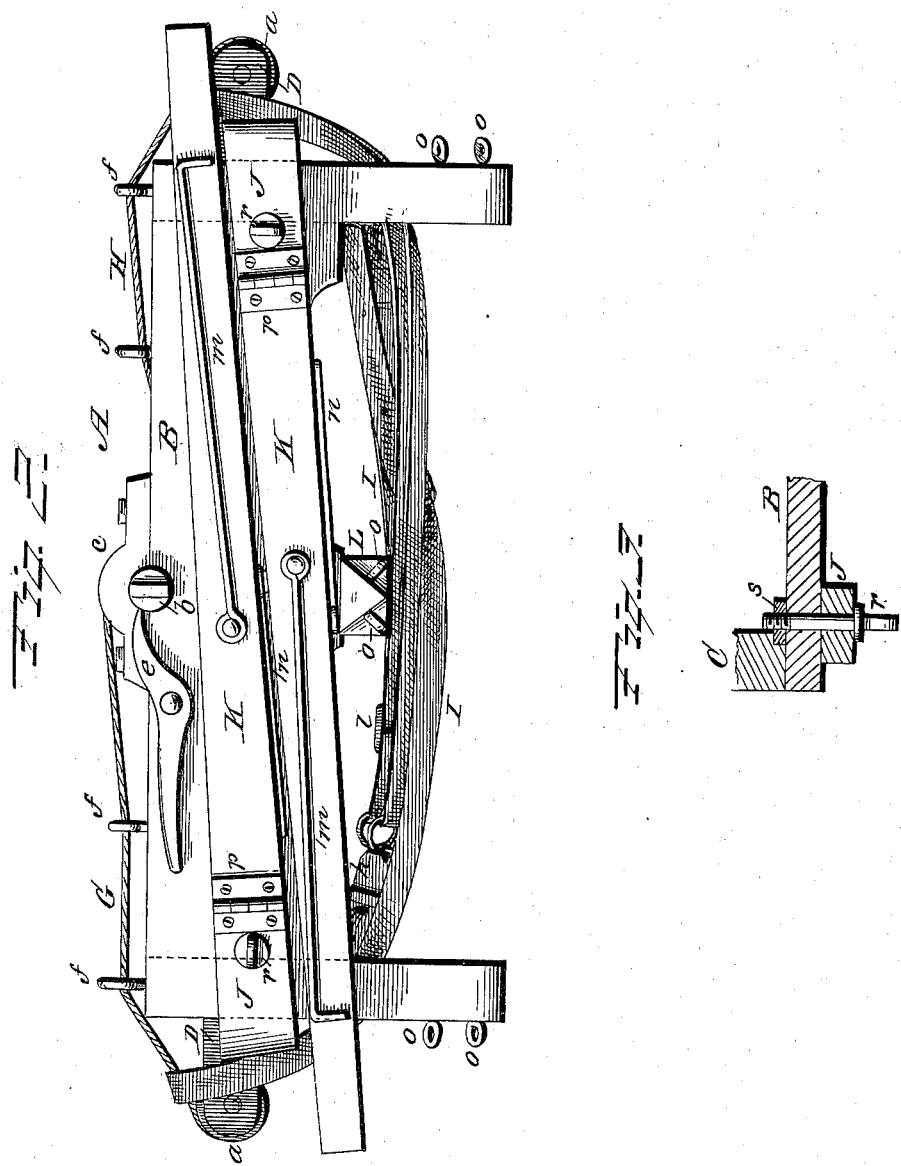

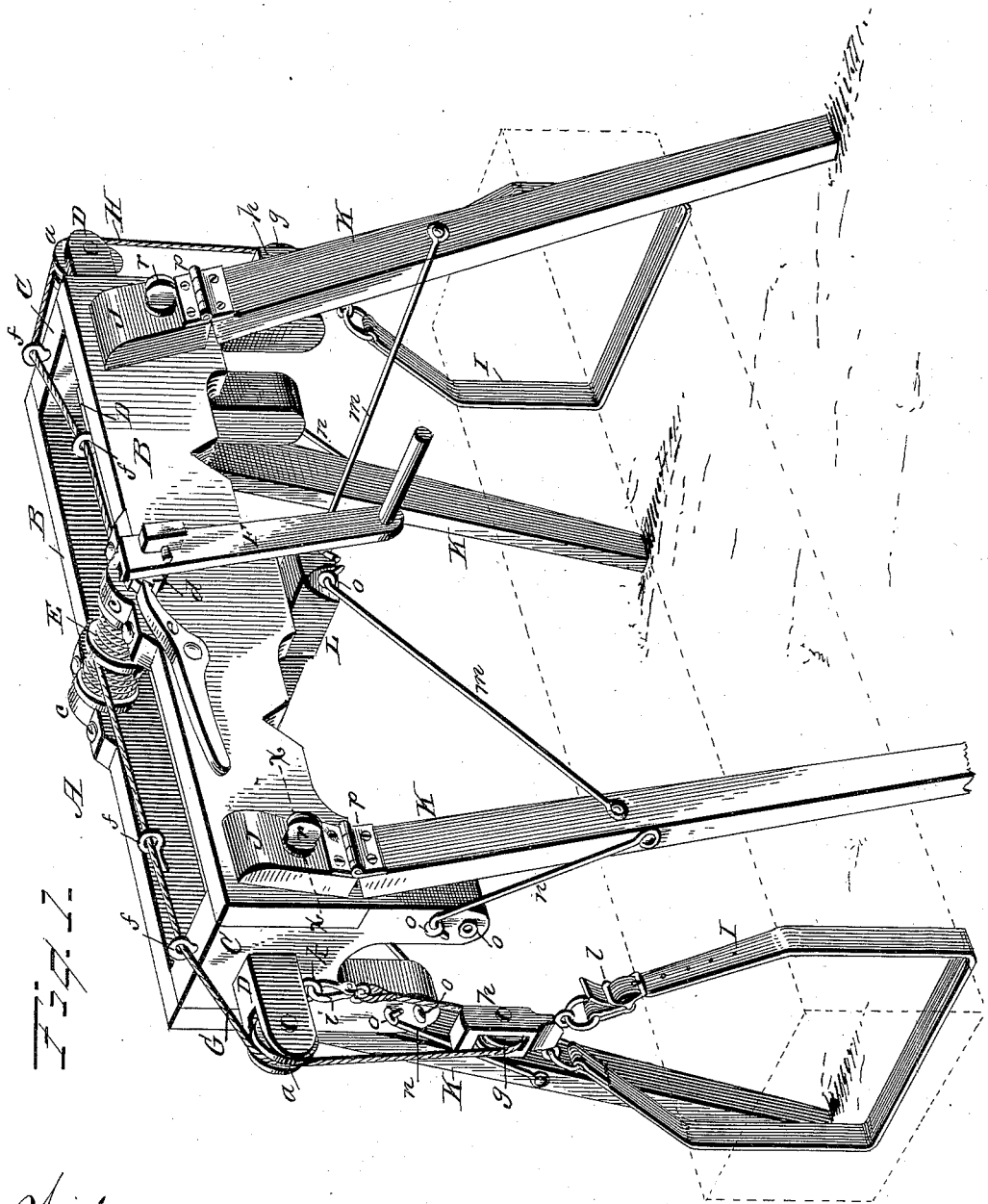

UNITED STATES PATENT OFFICE.

JACOB H. ZOOK, OF GUNN CITY, MISSOURI.

DEVICE FOR RAISING OR LOWERING COFFINS.

SPECIFICATION forming part of Letters Patent No. 609,070, dated August 16, 1898.

Application filed February 14, 1898. Serial No. 670,212. (No model.)

*To all whom it may concern:*

Be it known that I, JACOB H. ZOOK, a citizen of the United States, residing at Gunn City, in the county of Cass and State of Missouri, have invented certain new and useful Improvements in Devices or Apparatus for Raising or Lowering Coffins, &c.; and I do hereby declare that the following is a full, clear, and exact description of the same, reference being had to the annexed drawings, making a part of this specification, and to the letters of reference marked thereon.

The present invention has relation to that class of devices or apparatus especially adapted for raising and lowering coffins or caskets or other like objects and is designed as an improvement upon my former patent, dated August 17, 1897, and numbered 588,307.

The invention therefore consists in the several details of construction, substantially as shown in the drawings and hereinafter described and claimed.

Figure 1 of the drawings is a perspective view of a device or apparatus constructed substantially in accordance with my invention and in position for use, the box containing the coffin or casket being shown in dotted lines; Fig. 2, a side elevation showing the device or apparatus folded for packing or transportation; Fig. 3, a detail sectional view taken on line $x$ $x$ of Fig. 1, showing the nut of the screw-bolt engaging with the end of the rectangular frame to prevent it from turning.

In the accompanying drawings, A represents a rectangular frame of any preferred construction, said frame comprising the side sections B and end sections C, suitably connected together. A longitudinal brace D extends through the frame A and is of sufficient length to extend through and beyond the ends of the frame to provide pulley-blocks, to which grooved pulleys $a$ are suitably connected. A double windlass E has its shaft $b$ in bearings in the side sections B of the frame A and confined in position by the bearing-blocks $c$, and upon this shaft is a ratchet $d$, with which engages a gravitating and pivoted pawl $e$ upon one of the side sections of the frame. The shaft of the windlass has detachably connected thereto a suitable crank-handle F for turning it, and connected to the double windlass E are ropes or cords G H, which extend through suitable guides $f$, connected to the frame A. These ropes or cords extend over the pulleys $a$ and engage with the pulleys $g$ of the pulley-blocks $h$, and the ends of the ropes or cords are provided with a suitable snap-hook $i$ for detachably connecting it to the rings $k$ upon the under side of the projecting ends of the brace D, as shown in Fig. 1 of the drawings. The pulley-blocks $h$ have connected thereto suitable straps I, with buckles $l$ for securing around the ends of the box containing the coffin or casket, as shown in Fig. 1 of the drawings.

The supporting-legs to the frame A consist each of two sections J K, the main section K of the leg being suitably hinged to the upper section J, so that it may be brought at an angle to a perpendicular to give as wide a support to the frame as possible, as shown in Fig. 1 of the drawings, and when in a folded position, as shown in Fig. 2 of the drawings, to come close up against the sides of the frame, thus rendering the apparatus or device compact to be easily transported. When the lower or main sections K of the supporting-legs are extended, as shown in Fig. 1 of the drawings, said leg-sections are held in their extended position by the brace-rods $m$ and brace-rods $n$. These brace-rods are pivoted to the leg-sections K and have hooks at their free ends to engage with eyes or staples $o$ upon the end of the transverse block L, secured to the under side of the frame, and similar eyes or staples $o$ upon the end sections C of the frame. Two or more of these eyes or staples may be connected to the end sections C of the frame, so that it will admit of the adjustment of the leg-sections K with relation to each other to insure the horizontal position of the frame A upon uneven or graded places when the leg-sections are supported upon the ground. The upper leg-sections J are pivotally connected to the side sections B of the frame A at or near their ends, the leg-sections K being connected to the upper leg-sections by means of the hinges $p$ or by any other preferred means that will admit of their adjustment, as hereinbefore described. The upper leg-sections J are pivotally connected to the sides of the frame by means of a screw pivot-bolt $r$, provided with means for turning it with the hand. Upon the screw-threaded or inner end of the bolt $r$ is a screw-nut $s$, which engages with a mortise in the end section C of the frame, so as to hold the nut stationary while the pivot-bolt is being turned, as shown in Fig. 3 of the drawings.

When the device or apparatus is not required for use, the crank-handle may be removed, the brace-rods disconnected from the eyes or staples, and the pivot-bolts $r$ loosened. This will enable the upper leg-sections J to be brought around at right angles to their former position, so that the leg-sections K will lie close up against the sides B of the frame and parallel with each other, as shown in Fig. 2 of the drawings. When the leg-sections K are to be brought into position for use, as shown in Fig. 1 of the drawings, the leg-sections J are brought around to their former position and the pivot-bolts tightened and the brace-rods engaged with their respective eyes or staples.

The frame, also the double windlass, the cords or ropes, and the several pulleys and straps, may be variously modified or changed without departing from the principle of my invention.

Having now fully described my invention, what I claim as new, and desire to secure by Letters Patent, is—

1. In a device for raising and lowering coffins, caskets, and other objects, means for supporting the frame thereof above the ground consisting of adjustable legs formed of hinged sections and pivotally connected to the frame, in combination with brace-rods, said rods being arranged in pairs which are pivotally connected to each leg and detachably connected to the frame to form braces for the legs and retain them in their adjusted position, substantially as and for the purpose set forth.

2. A device for raising and lowering coffins, caskets, and other objects, consisting of a suitable frame, a windlass with cords or ropes provided with means for attaching to the object to be raised or lowered, supporting-legs for the frame, each leg comprising two hinged sections, the upper one of the sections adapted to be held in a vertical or horizontal position by means of screw pivot-bolts, and brace-rods arranged in pairs which are pivotally connected to the legs and detachably connected to the frame, one of the legs of each pair being adjustably connected to the frame to adapt the rods to the adjusted position of the legs, substantially as and for the purpose described.

In testimony that I claim the above I have hereunto subscribed my name in the presence of two witnesses.

JACOB H. ZOOK.

Witnesses:
F. O. NEECE,
F. W. FOSTER.